(12) United States Patent
Richards et al.

(10) Patent No.: US 8,960,946 B2
(45) Date of Patent: Feb. 24, 2015

(54) LOTUS LIGHT

(71) Applicants: James Richards, Gordonsville, VA (US); James Gustav Harris, Foster City, CA (US)

(72) Inventors: James Richards, Gordonsville, VA (US); James Gustav Harris, Foster City, CA (US)

(*) Notice: Subject to any disclaimer, the term of this patent is extended or adjusted under 35 U.S.C. 154(b) by 146 days.

(21) Appl. No.: 13/739,244

(22) Filed: Jan. 11, 2013

(65) Prior Publication Data

US 2013/0188340 A1 Jul. 25, 2013

Related U.S. Application Data

(60) Provisional application No. 61/589,433, filed on Jan. 23, 2012.

(51) Int. Cl.
| | |
|---|---|
| *F21L 4/00* | (2006.01) |
| *F21L 13/00* | (2006.01) |
| *F21L 4/08* | (2006.01) |
| *A01G 7/04* | (2006.01) |
| *F21S 9/03* | (2006.01) |
| *F21V 21/08* | (2006.01) |
| *A45B 3/04* | (2006.01) |
| *A45F 3/44* | (2006.01) |
| *F21V 17/02* | (2006.01) |
| *F21W 131/10* | (2006.01) |
| *F21Y 101/02* | (2006.01) |

(52) U.S. Cl.
CPC . *F21L 4/08* (2013.01); *A01G 7/045* (2013.01); *F21S 9/037* (2013.01); *F21V 21/0824* (2013.01); *A45B 3/04* (2013.01); *A45F 3/44* (2013.01); *F21V 17/02* (2013.01); *F21W 2131/10* (2013.01); *F21Y 2101/02* (2013.01); *Y10S 362/802* (2013.01)
USPC ............................ 362/183; 362/276; 362/802

(58) Field of Classification Search
CPC ............... F21L 4/08; F21S 9/03; F21S 9/032; F21S 9/035; F21S 9/037
USPC .......................................... 362/183, 276, 802
See application file for complete search history.

(56) References Cited

U.S. PATENT DOCUMENTS

| | | | | |
|---|---|---|---|---|
| 4,558,893 | A | * | 12/1985 | Shelly ........................... 285/354 |
| D366,226 | S | | 1/1996 | Foutes |
| 6,488,387 | B2 | | 12/2002 | Wardenburg |
| 6,582,105 | B1 | * | 6/2003 | Christensen .................. 362/385 |
| 6,688,759 | B1 | | 2/2004 | Hadjimichael |
| 6,921,182 | B2 | | 7/2005 | Anderson, Jr. et al. |
| 2006/0112633 | A1 | | 6/2006 | Humphrey et al. |
| 2007/0002561 | A1 | * | 1/2007 | Tesmer et al. ................. 362/183 |
| 2009/0190363 | A1 | | 7/2009 | McDonnell et al. |

(Continued)

*Primary Examiner* — Jason Moon Han
(74) *Attorney, Agent, or Firm* — Buckingham, Doolittles & Burroughs, LLC

(57) ABSTRACT

A multifunctional device is disclosed for facilitating plant growth by shining a solar-powered light over plants, and can provide other functions. The multifunctional device comprises a center post, a ground stake, and solar panels. The center post telescopically expands and retracts. The ground stake tapers to a point on one end and can be secured in the ground. Further, the solar panels fold down against the center post for storage, unfold perpendicular to the center post, and are locked in place when in use via a locking collar. The solar panels comprise an underside and a topside, with solar cells secured to the topside and lights secured to the underside. The solar cells absorb sunlight, and turn the sunlight into electrical energy which is used to charge the solar batteries housed in the center post. The solar batteries power the lights located on the solar panels.

13 Claims, 4 Drawing Sheets

(56) References Cited

U.S. PATENT DOCUMENTS

| | | |
|---|---|---|
| 2009/0288340 A1 | 11/2009 | Hess |
| 2010/0008081 A1 | 1/2010 | Canino et al. |
| 2010/0154786 A1* | 6/2010 | Li .................................. 126/624 |
| 2010/0175318 A1 | 7/2010 | Ahmadi |
| 2010/0277078 A1 | 11/2010 | Morton |

* cited by examiner

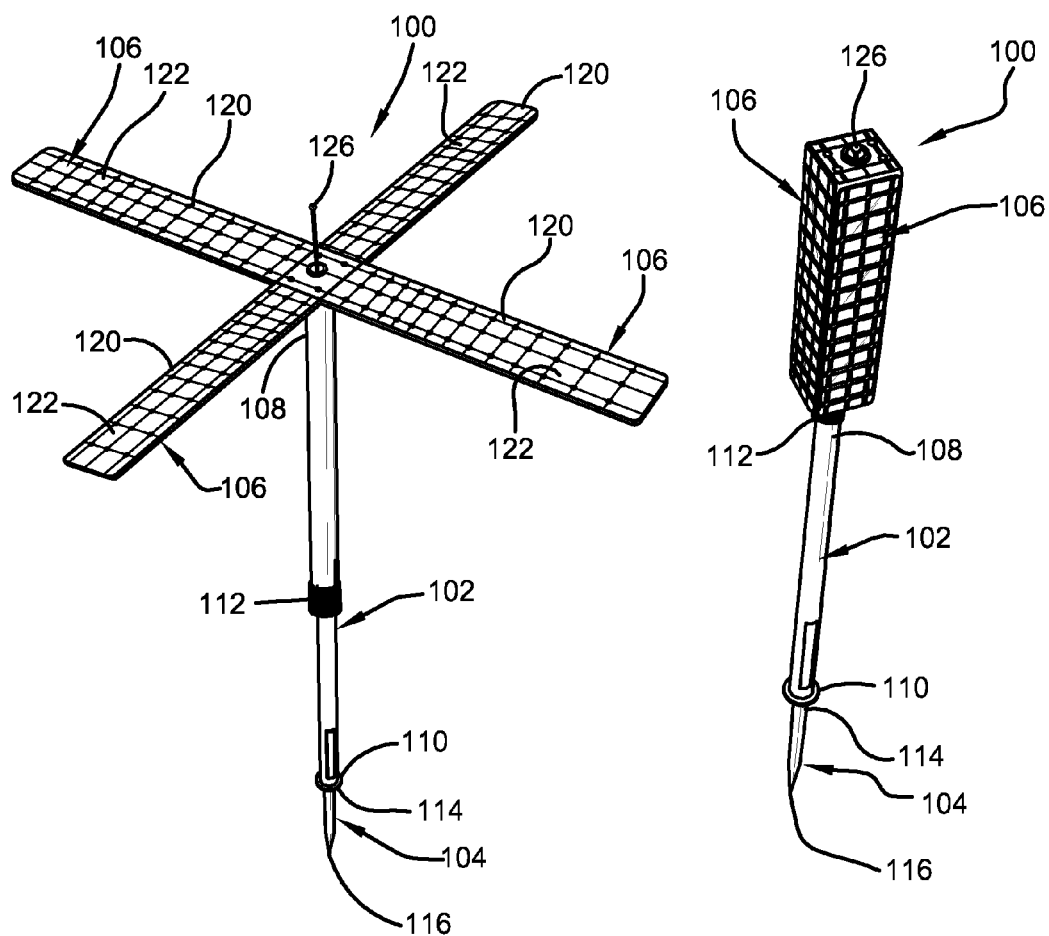
FIG. 2A
FIG. 2B
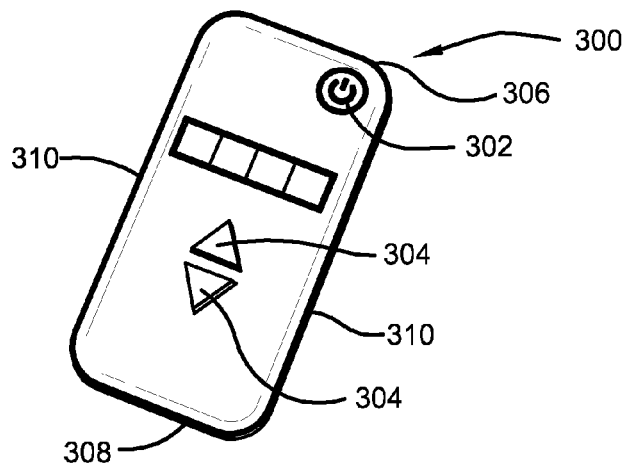
FIG. 3

LOTUS LIGHT

CROSS-REFERENCE

This application claims priority from Provisional Patent Application Ser. No. 61/589,433 filed Jan. 23, 2012.

BACKGROUND

Outdoor plants receive, on average, approximately twelve hours of sunlight a day in most regions of the world. Depending upon the plant variety, plants can typically live and sustain off of this amount of sunlight, but in order to maximize the plants growth potential, plants may acquire more sunlight. Some people may add chemicals to the soil or to the plants themselves to facilitate growth, but this is not always good for the plants and/or for human consumption in the case of fruit or vegetable plants. Additionally, intruders such as animals can be a common problem in outdoor landscapes if there is no way for the landowner to scare them away and/or prevent them from disturbing the plants. An effective solution to prevent these problems is necessary; instant remote lighting to a field from a Lotus Light device provides a solution.

There is a need for a multifunctional device that can provide solar-generated light to help plants grow, among other things. The present invention resembles a weatherproof ground stake with hinged solar panels on the end of the stake that can fold and unfold. The stake can be placed in the ground and can shine light on plants and other objects, even without sunlight, to help the plant grow. Users can use this multifunctional device in a variety of ways, such as campsite lighting, or as a way to scare off intruders on their land. The multifunctional device can also be used indoors with houseplants. Anyone who wants their plants to grow quickly or needs a convenient lighting device can appreciate the benefits of this invention.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one aspect thereof, comprises a multifunctional device used to facilitate plant growth by providing solar-powered light to plants, as well as can provide many other functions. The multifunctional device comprises a center post, a ground stake, at least one solar panel, and at least one light. The center post telescopically expands and retracts. The ground stake tapers to a point on one end and can be secured in the ground, or any other pierce-able surface. Further, the solar panels fold down against the center post for easy storage, unfold perpendicular to the center post, and are locked in place when in use via a locking collar.

In a preferred embodiment, the solar panels comprise an underside and a topside. The topside comprises at least one solar cell secured to the solar panels, though there can be any suitable number of solar cells secured to the topside of the solar panels. Further, the underside of the solar panels comprises at least one light, though there can be any suitable number of lights secured to the underside of the solar panels. Using existing technology, the solar cells of the solar panels absorb sunlight, and turn the sunlight into electrical energy, which is used to charge the solar batteries housed in the center post. The solar batteries then power the lights located on the underside of the solar panels. If the multifunctional device is used inside, the solar batteries are replaced with standard batteries which are used to power the lights located on the underside of the solar panels.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

BRIEF DESCRIPTION OF THE DRAWINGS

FIG. 2A illustrates a top perspective view of the multifunctional device with the solar panels unfolded in accordance with the disclosed architecture.

FIG. 2B illustrates a top perspective view of the multifunctional device with the solar panels folded in accordance with the disclosed architecture.

FIG. 3 illustrates a front perspective view of the remote control device in accordance with the disclosed architecture.

DESCRIPTION OF PREFERRED EMBODIMENTS

Figure 1:
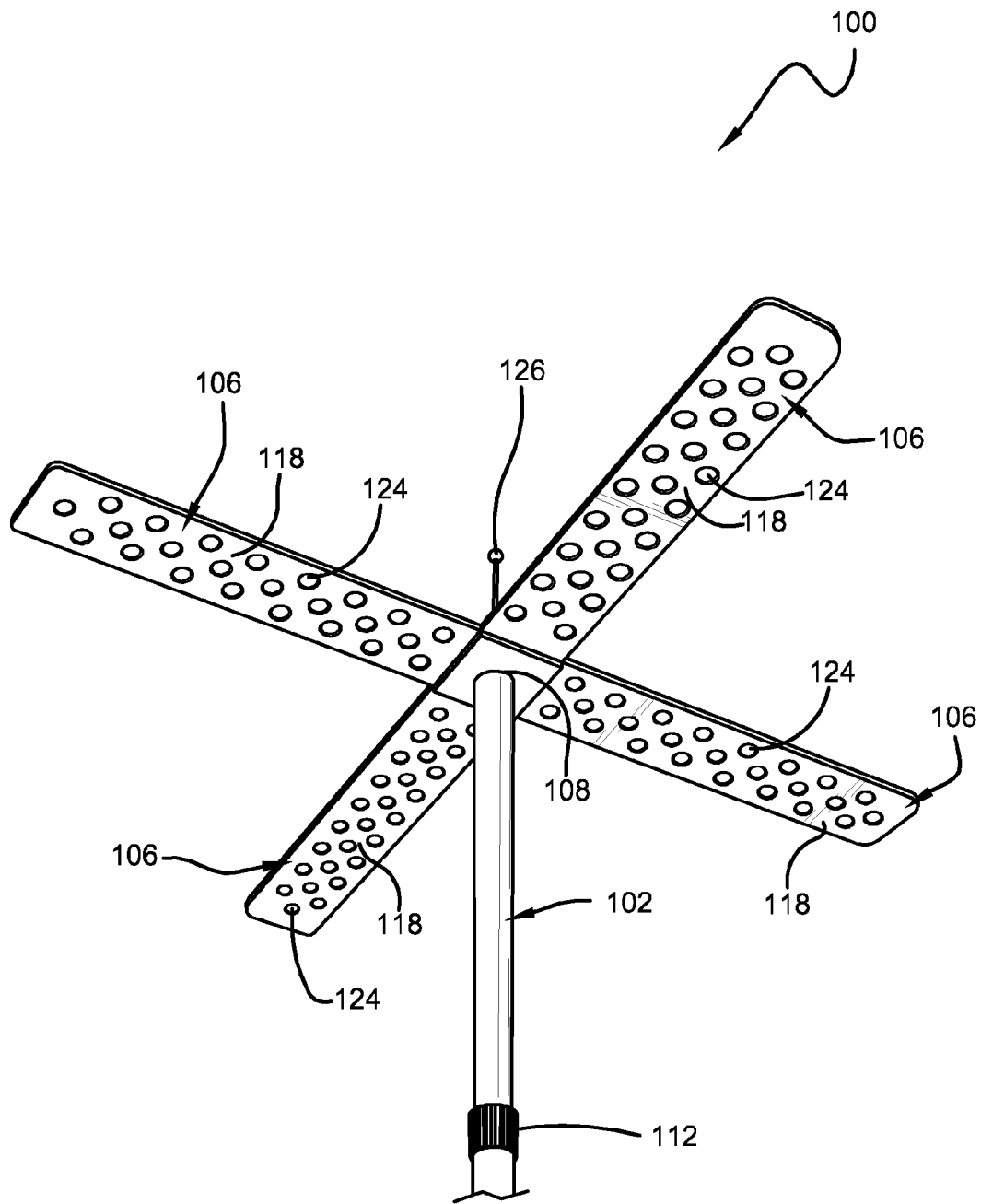
FIG. 1 illustrates a front perspective view of the multifunctional device in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

The present invention discloses a multifunctional device that can provide solar-generated light to facilitate plant growth, as well as provide many other functions. The present invention resembles a weatherproof ground stake with hinged solar panels on an end of the stake that can fold and unfold. The stake can be placed in the ground and can shine light on plants and other objects, even when it's dark outside, to help them grow. Users can use this multifunctional device in a variety of ways, such as a lighted walking stick when hiking, as campsite lighting, or as a way to scare off intruders. The multifunctional device can also be used indoors with houseplants or for other lighting purposes.

The multifunctional device comprises a center post, a ground stake, and solar panels. The center post telescopically expands and retracts. The ground stake tapers to a point on one end and can be secured in the ground. Further, the solar panels fold down against the center post for storage and unfold perpendicular to the center post and are locked in place when in use via a locking collar. The solar panels comprise an underside and a topside, with solar cells secured to the topside and lights secured to the underside. The solar cells absorb sunlight, and turn the sunlight into electrical energy which is used to charge the solar batteries housed in the center post, using known technologies. The solar batteries power the lights located on the solar panels.

Referring initially to the drawings, FIG. 1 and FIGS. 2A-2B illustrate the multifunctional device 100 used to facilitate plant growth by shining a solar-powered light over plants, as well as can provide many other functions. The multifunctional device 100 comprises a center post 102, a ground stake 104, and at least one solar panel 106. The center post 102 comprises a first end 108 and a second end 110. Typically, the center post 102 is cylindrical in shape, such as in the shape of a dowel rod, however any other suitable shape can be used as is known in the art without affecting the overall concept of the invention.

The center post 102 would generally be constructed of aluminum, steel, wood, or a composite plastic, etc., though any other suitable material may be used to manufacture the center post 102 as is known in the art without affecting the overall concept of the invention. The center post 102 can also comprise a variety of colors and designs to suit user preference. The center post 102 is approximately between 36 and 48 inches long as measured from the first end 108 to the second end 110, when the center post 102 is fully extended, and approximately between 12 and 24 inches long as measured from the first end 108 to the second end 110, when the center post 102 is retracted, and approximately between 1 and 2 centimeters in diameter.

Typically, the center post 102 is hollow, but it does not have to be and can function by being partly or wholly solid. Additionally, the interior of the center post 102 can house at least one battery (not shown). The battery can be a solar battery, a standard chemical battery, or any other type of battery or size of battery as is known in the art. Further, the center post 102 telescopically extends and retracts, and can be secured in place once extended via a locking collar 112 or other suitable securing means as is known in the art such as via a pin or the like. Thus, the center post 102 can retract or collapse for easy storage and then be extended longitudinally and secured when in use.

The multifunctional device 100 further comprises a ground stake 104 comprising a first end 114 and a second end 116. The first end 114 of the ground stake 104 is secured to the second end 110 of the center post 102 via any suitable securing means as is known in the art, such as welding, gluing, threading, etc. The second end 116 of the ground stake 104 preferably tapers to a point such that the ground stake 104 can be secured in the ground, or any other pierceable surface. Typically, the ground stake 104 is cylindrical in shape, however any other suitable shape can be used as is known in the art without affecting the overall concept of the invention. Further, the ground stake 104 would generally be constructed of the same materials as the center post 102, such as aluminum, steel, wood, or a composite plastic, etc., though any other suitable material may be used to manufacture the ground stake 104 as is known in the art without affecting the overall concept of the invention. The ground stake 104 can also comprise a variety of colors and designs to suit user preference.

The multifunctional device 100 further comprises at least one solar panel 106 hinged securely to the first end 108 of the center post 102. The solar panels 106 are typical solar panels 106 as is known in the art, and function as typical prior art solar panels. There can be any suitable number of solar panels 106 secured to the first end 108 of the center post 102, but preferably there are approximately between three and five solar panels 106. Further, the solar panels 106 are secured to the first end 108 of the center post 102 via a lockable hinge, a lockable ball-joint hinge, or any other suitable pivoting securing means as is known in the art. The securing means allows the solar panels 106 to pivot approximately 180 degrees, and be tilted or directed toward the sun.

Further, the solar panels 106 can fold down against (or axially parallel to) the center post 102 for storage and unfold perpendicular to the center post 102 and are locked in place when in use. The solar panels 106 are locked in place via a locking collar 112 or other suitable securing means as is known in the art. Further, the retraction and extension of the center post 102 can also act to fold or unfold the solar panels 106, such that when the center post 102 is retracted for storage, the solar panels 106 fold down as well, against the center post 102. And, when the center post 102 is extended, the solar panels 106 are unfolded perpendicular to the center post 102, the center post 102 and the solar panels 106 are then secured in place via a locking collar 112.

Furthermore, the solar panels 106 comprise an underside 118 and topside 120. Typically, the topside 120 comprises at least one solar cell 122, however the solar cells 122 can be positioned on any suitable surface of the solar panels 106. Further, there can be any suitable number of solar cells 122 secured to the solar panels 106, but preferably there are approximately a plurality of solar cells 122 secured to the topside 120 of each solar panel 106. The solar cells 122 are typical solar cells as is known in the art, and function as typical prior art solar cells. The solar cells 122 are secured to the solar panels 106 via gluing, molding, or any other suitable securing means as is known in the art.

Furthermore, typically the underside 118 of the solar panels 106 comprises at least one light 124, however the lights 124 can be positioned on any suitable surface of the solar panels 106. Further, there can be any suitable number of lights 124 secured to the solar panels 106, but preferably there are approximately a plurality of lights 124 secured to the underside 118 of each solar panel 106. The lights 124, can be light emitting diodes (LEDs), fluorescent lights, incandescent lights, a mixture thereof, or any other suitable light source as is known in the art. The lights 124 are secured to the solar panels 106 via gluing, molding, screwing in, embedding, or any other suitable securing means as is known in the art. Further, the type, amount, color, and configuration of the lights 124 are not limited to a specific design or configuration and can comprise any suitable type, amount, design, color, and/or configuration of lights that could be implemented during manufacturing to suit manufacturing needs and consumer preferences, as well as the wants and needs of a user. For example, if LEDs are used, different proportions of colored LEDs can provide more optimal results for plant growth.

The solar cells 122, lights 124, and batteries are in electrical communication with each other, such that the solar cells 122 of the solar panels 106 absorb sunlight, and turn the sunlight into electrical energy which is used to charge the solar batteries housed in the center post 102, using known technology. The solar batteries then power the lights 124 located on the underside 118 of the solar panels 106. If the multifunctional device 100 is used inside, the solar batteries are replaced with standard batteries which are used to power the lights 124 located on the underside 118 of the solar panels 106. Or, the multifunctional device 100 can be placed outside to charge the solar batteries, and then brought inside and used.

Further, the multifunctional device 100 can comprise a motor (not shown) or other actuation device which acts to remotely fold and unfold the solar panels 106. Specifically, the solar panels 106 can be folded down against the center post 102 or unfolded perpendicular to the center post 102 manually or via a handheld remote control device (shown in FIG. 3 as 300). For example, an actuator or mechanical arm or other linkage communicates with the solar panels and motor to fold and unfold the solar panels 106.

If a handheld remote control device is used, the center post 102 further comprises an external antenna 126 or internal antenna (not shown) that communicates with the handheld remote control device. The external antenna 126 would be secured to the first end 108 of the center post 102 via any suitable securing means as is known in the art, such as welding, gluing, threading, etc. In use, the handheld remote control device would produce a radio frequency (RF) signal, or other suitable signal, and would then send this signal to the external antenna 126 or internal antenna, the external antenna 126 or internal antenna would then communicate with the motor to remotely fold and unfold the solar panels 106, using existing technologies.

FIG. 3 illustrates the handheld remote control device 300. Typically, the handheld remote control device 300 is rectangular in shape, however any other suitable shape can be used as is known in the art without affecting the overall concept of the invention. The handheld remote control device 300 would generally be constructed of plastic, such as polycarbonate, polyvinyl chloride (PVC), or acrylonitrile butadiene styrene (ABS), though any other suitable material may be used to manufacture the handheld remote control device 300 as is known in the art without affecting the overall concept of the invention. The handheld remote control device 300 is approximately between 1 and 4 inches long as measured from the first end 306 to the second end 308, approximately between 1 and 3 inches wide as measured from opposing sides 310, and approximately between 0.25 and 2 centimeters thick.

Specifically, the handheld remote control device 300 comprises, among other functions, a power switch 302 for powering on and off the handheld remote control device 300, and up and down arrow controls 304 for raising or lowering the solar panels. However, the handheld remote control device 300 is not limited to these functions and can comprise additional functionalities that could be implemented during manufacturing to suit manufacturing needs and consumer preferences, as well as the wants and needs of a user. As stated supra, the handheld remote control device 300 produces an RF signal, or other suitable signal, which is then sent to the external antenna (shown in FIG. 2A) or internal antenna. The external or internal antenna then communicates with the motor of the multifunctional device to remotely fold and unfold (or raise and lower) the solar panels.

Figure 4:
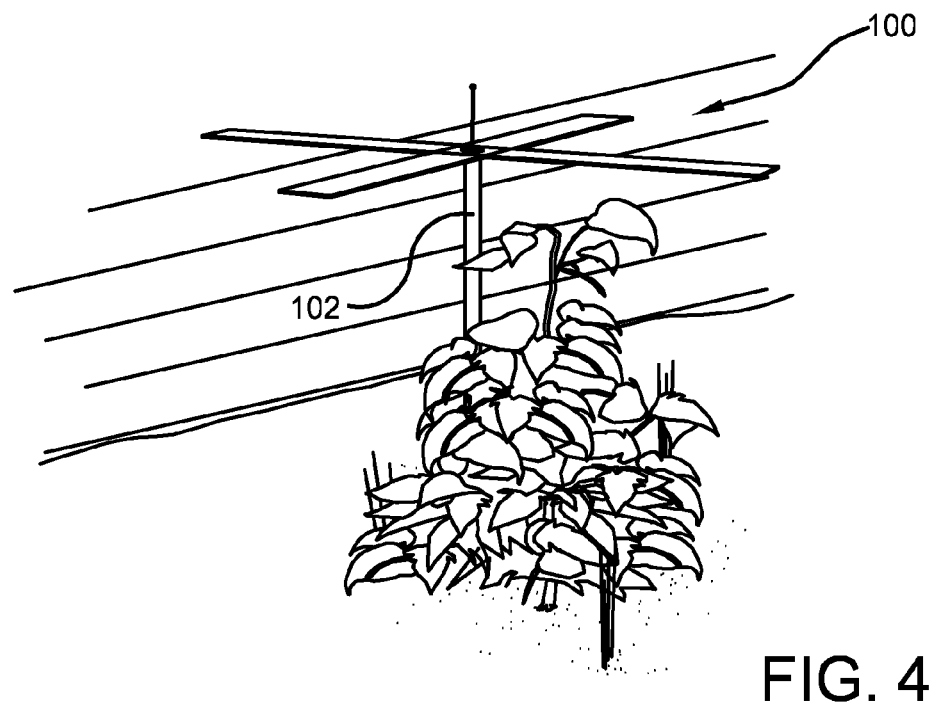
FIG. 4 illustrates a perspective view of the multifunctional device in use outside in accordance with the disclosed architecture.
Figure 5:
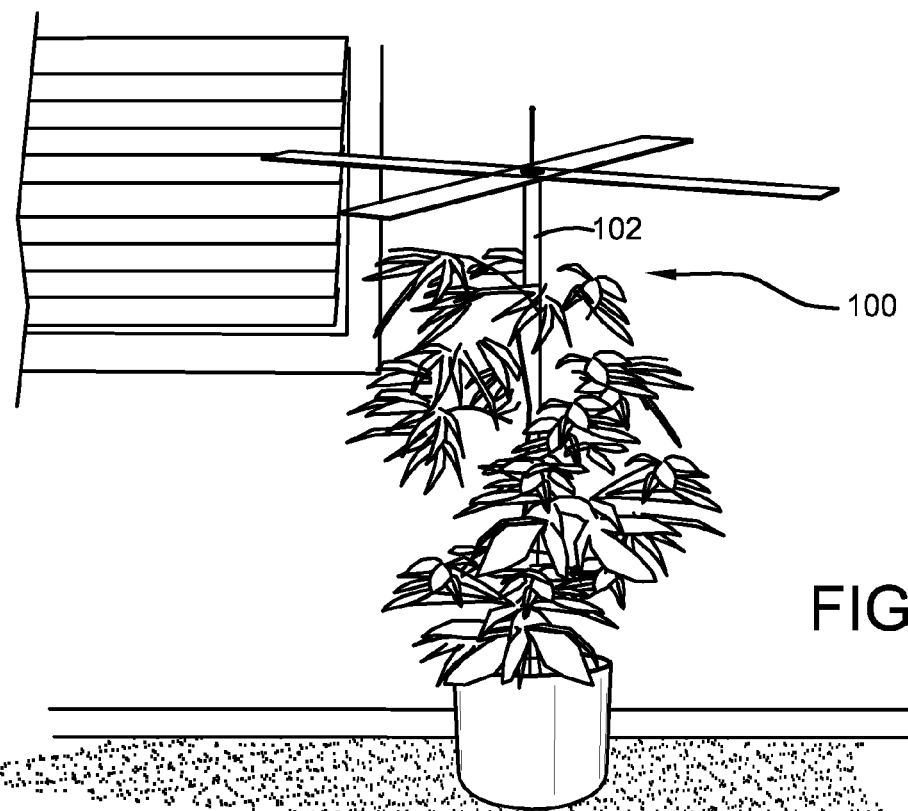
FIG. 5 illustrates a perspective view of the multifunctional device in use inside in accordance with the disclosed architecture.

FIGS. 4-5 illustrate the multifunctional device 100 in use. Specifically, FIG. 4 illustrates the multifunctional device 100 in use outside and FIG. 5 illustrates the multifunctional device 100 in use indoors. In operation, a user (not shown) would choose the color and/or specific design of the multifunctional device 100 that meets their needs and/or wants. The user would then telescopically expand the center post 102 of the multifunctional device 100 and secure it in the expanded position by tightening a locking collar 112. The user would then manually or remotely via a handheld remote control device 300 unfold the solar panels 106 and secure them in place by tightening a locking collar 112. Further, the retraction and extension of the center post 102 can also act to fold or unfold the solar panels 106, such that when the center post 102 is extended, the solar panels 106 are simultaneously unfolded perpendicular to the center post 102, the center post 102 and the solar panels 106 are then secured in place via a locking collar 112.

Once in position, the multifunctional device 100 is then inserted into the ground or other pierce-able surface via the ground stake 104, such that it stands over a plant, flower, etc. For example, in use outside, the ground stake 104 would be inserted into the ground via its tapered point, and in use indoors, the ground stake 104 would be inserted into the potting soil of a potted plant via its tapered point. A user inserts the ground stake 104 into the surface and pushes downward toward the ground until enough of the center post 102 is inserted into the ground or other surface, such that the multifunctional device 100 securely stands vertical out of the ground, over the plant, flower, etc. A user then adjusts the solar panels 106 to either turn them towards the sunlight and/or focus the lights on their underside toward the plant, flower, etc. Light is then shown on the plant, flower, etc., facilitating its growth.

Figure 6:
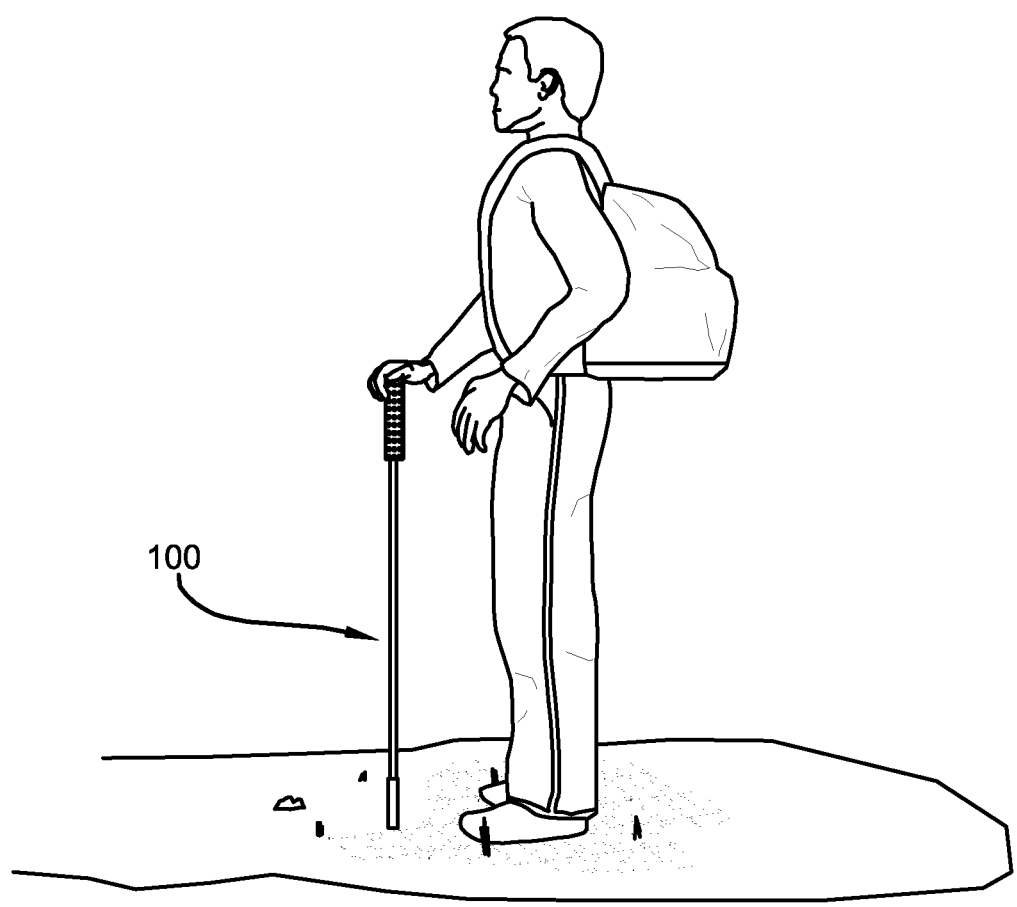
FIG. 6 illustrates a perspective view of the multifunctional device in use as a walking stick in accordance with the disclosed architecture.

FIG. 6 illustrates the multifunctional device 100 in use as a lighted walking stick. The multifunctional device 100 can provide solar-generated light to help plants grow. The multifunctional device 100 can be placed in the ground and can shine light on plants, even when it's dark outside, to help them grow. Additionally, users can use the multifunctional device 100 as a lighted walking stick when walking or hiking, as campsite lighting, or as a way to scar off intruders, or for any other lighting function. The multifunctional device 100 can also be used indoors with houseplants. Anyone who wants their plants to grow quickly or needs a convenient lighting device can appreciate the benefits afforded by this product.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A multifunctional device, comprising:
   a center post comprising a first end and a second end;
   four solar panels hinged securely to the first end and comprising an underside and a topside; and
   at least one light secured to each of the four solar panels; and
   wherein the four solar panels fold down against the center post for storage and unfold perpendicular to the center post and are locked in place via a locking collar when in use; and
   wherein the center post retracts and extends telescopically and is locked in place via the locking collar; and
   wherein the retraction and extension of the center post also acts to fold or unfold the four solar panels, such that when the center post is retracted the four solar panels fold down as well, and when the center post is extended the four solar panels are unfolded perpendicular to the center post, and then both the center post and the solar panels are secured in place via the locking collar.

2. The multifunctional device of claim 1, wherein the at least one light is a light emitting diode (LED) light embedded in the underside of each of the four solar panels.

3. The multifunctional device of claim 2, further comprising at least one battery which powers the at least one light.

4. The multifunctional device of claim 3, wherein the at least one battery is a solar battery which is charged via the four solar panels.

5. The multifunctional device of claim 1, further comprising a remote control for controlling movement of the four solar panels.

6. The multifunctional device of claim 5, further comprising an external antenna for communicating with the remote control.

7. The multifunctional device of claim 1, further comprising a ground stake secured to the second end of the center post.

8. A multifunctional device, comprising:
a center post comprising a first end and a second end;
four solar panels hinged securely to the first end and comprising an underside and a topside, wherein the four solar panels folds down against the center post for storage and unfolds perpendicular to the center post and are locked in place via a locking collar when in use; and
a plurality of lights secured on the four solar panels; and
a ground stake secured to the second end of the center post; and
wherein the center post retracts and extends telescopically and is locked in place via the locking collar; and
wherein the retraction and extension of the center post also acts to fold or unfold the four solar panels, such that when the center post is retracted the four solar panels fold down as well, and when the center post is extended the four solar panels are unfolded perpendicular to the center post, and then both the center post and the solar panels are secured in place via the locking collar.

9. The multifunctional device of claim 8, further comprising at least one battery which power the plurality of lights.

10. The multifunctional device of claim 9, wherein the at least one battery is a solar battery which is charged via the four solar panels.

11. The multifunctional device of claim 8, further comprising a remote control for controlling movement of the four solar panels.

12. The multifunctional device of claim 11, further comprising an antenna for communicating with the remote control.

13. A multifunctional device, comprising:
a center post comprising a first end and a second end;
four solar panels hinged securely to the first end and comprising an underside and a topside, wherein the four solar panels fold down against the center post for storage and unfolds perpendicular to the center post and are locked in place via a locking collar when in use;
a plurality of LEDs embedded on the underside of the four solar panels; and
a ground stake secured to the second end of the center post; and
wherein the center post retracts and extends telescopically and is locked in place via the locking collar; and
wherein the retraction and extension of the center post also acts to fold or unfold the four solar panels, such that when the center post is retracted the four solar panels fold down as well, and when the center post is extended the four solar panels are unfolded perpendicular to the center post, and then both the center post and the solar panels are secured in place via the locking collar.

* * * * *